United States Patent
Crum

(10) Patent No.: US 10,649,361 B1
(45) Date of Patent: May 12, 2020

(54) PROCESS FOR FORMING HEAT-RESISTANT LASER PRINTABLE COATING ON PVC SHEET

(71) Applicant: WARD KRAFT, INC., Fort Scott, KS (US)

(72) Inventor: Jesse Crum, Fort Scott, KS (US)

(73) Assignee: Ward Kraft, Inc., Fort Scott, KS (US)

(*) Notice: Subject to any disclaimer, the term of this patent is extended or adjusted under 35 U.S.C. 154(b) by 0 days.

(21) Appl. No.: 16/056,777

(22) Filed: Aug. 7, 2018

Related U.S. Application Data

(60) Provisional application No. 62/545,544, filed on Aug. 15, 2017.

(51) Int. Cl.
*G03G 15/04* (2006.01)
*B05D 1/28* (2006.01)
(Continued)

(52) U.S. Cl.
CPC ......... *G03G 15/04072* (2013.01); *B05D 1/28* (2013.01); *B05D 3/007* (2013.01); *B05D 3/0254* (2013.01); *B05D 3/04* (2013.01); *B05D 3/0406* (2013.01); *B05D 3/0413* (2013.01); *B05D 5/00* (2013.01); *B05D 7/04* (2013.01); *B05D 7/24* (2013.01); *C08J 7/06* (2013.01); *C09D 5/002* (2013.01); *C09D 5/18* (2013.01); *C09D 5/32* (2013.01); *C09D 11/033* (2013.01); *C09D 11/037* (2013.01); *B05D 2201/02* (2013.01);
(Continued)

(58) Field of Classification Search
CPC ........ B05D 1/28; B05D 3/007; B05D 3/0254; B05D 3/04; B05D 3/0406; B05D 3/0413; B05D 5/00; B05D 7/04; B05D 7/24; B05D 2201/02; B05D 2252/00; B05D 2401/20; C09D 5/00; C09D 5/002; C09D 5/32; C08J 7/06; G03G 15/04072
See application file for complete search history.

(56) References Cited

U.S. PATENT DOCUMENTS

| | | | |
|---|---|---|---|
| 2005/0153113 A1* | 7/2005 | Hseih | G09F 3/02 428/201 |
| 2007/0218796 A1* | 9/2007 | Yao | D21H 27/34 442/412 |

(Continued)

FOREIGN PATENT DOCUMENTS

| | | | |
|---|---|---|---|
| CN | 201235626 Y | * | 5/2009 |
| CN | 102218953 A | * | 10/2011 |

(Continued)

OTHER PUBLICATIONS

Griese, E. W. Work & Turn Aqueous Coatings. https://www.corkindustries.com/tech-uv-eb-aqueous-coatings-blog/384-work-turn-aqueous-coatings.html (accessed Sep. 29, 2019). (Year: 2019).*

*Primary Examiner* — William P Fletcher, III
(74) *Attorney, Agent, or Firm* — Lathrop GPM LLP

(57) ABSTRACT

Methods of printing indicia on PVC sheets with laser printers. The method includes manufacturing a heat resistant coating that includes each of a water based ink, a work and turn coating, and Calcium Sulfate. The heat resistant coating is applied to the PVC sheet and is allowed to dry thereon. Indicia is printed on the PVC sheet with the laser printer. During a printing process, a temperature of a fuser assembly of the laser printer exceeds 290 degree Fahrenheit.

15 Claims, 7 Drawing Sheets

(51) Int. Cl.
    *B05D 3/02*     (2006.01)
    *B05D 5/00*     (2006.01)
    *B05D 7/04*     (2006.01)
    *B05D 3/04*     (2006.01)
    *B05D 3/00*     (2006.01)
    *B05D 7/24*     (2006.01)
    *C09D 5/18*     (2006.01)
    *C09D 11/033*     (2014.01)
    *C09D 5/00*     (2006.01)
    *C08J 7/06*     (2006.01)
    *C09D 11/037*     (2014.01)
    *C09D 5/32*     (2006.01)

(52) U.S. Cl.
    CPC ...... *B05D 2252/00* (2013.01); *B05D 2401/20* (2013.01); *C08J 2327/06* (2013.01); *G03G 2215/00493* (2013.01)

(56) References Cited

U.S. PATENT DOCUMENTS

2008/0150275 A1*   6/2008   Raistrick ............... G09F 3/0288
                                                                         283/81
2016/0303833 A1*  10/2016   Wang ...................... B29C 48/21

FOREIGN PATENT DOCUMENTS

| CN | 103342064 | A | * | 10/2013 |
| CN | 105176208 | A | * | 12/2015 |
| CN | 108909229 | A | * | 11/2018 |
| CN | 108912873 | A | * | 11/2018 |

\* cited by examiner

PROCESS FOR FORMING HEAT-RESISTANT LASER PRINTABLE COATING ON PVC SHEET

CROSS REFERENCE TO RELATED APPLICATIONS

This application claims priority to U.S. Provisional Patent Application Ser. No. 62/545,544 filed 15 Aug. 2017 and titled "Laser Printable PVC Sheets and Methods of Making and Using Same", the disclosure of which is incorporated herein by reference in its entirety.

FIELD OF THE DISCLOSURE

The disclosure relates generally to the field of heat-resistant coatings. More specifically, the disclosure relates to heat-resisting coatings which, when applied to an article, enable the article to receive laser printed indicia.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a PVC sheet has a front side and a back side. At least one of the front side and the back side is coated with a heat resistant coating and has indicia printed thereon using a laser printer. The heat resistant coating comprises each of a water based ink, a work and turn coating, Calcium Sulfate, Baking Soda, and fumed Silica. The laser printer includes a fuser assembly the temperature of which, during a printing process, exceeds 290 degree Fahrenheit.

According to another embodiment, a method of printing on a PVC sheet indicia using a laser printer comprises manufacturing a heat resistant coating. The heat resistant coating comprises each of a water based ink, a work and turn coating, Calcium Sulfate, Baking Soda, and fumed Silica. The method includes applying the heat resistant coating to the PVC sheet. The method comprises allowing the heat resistant coating to dry on the PVC sheet. The method includes printing indicia on the PVC sheet using the laser printer. During a printing process, a temperature of a fuser assembly of the laser printer exceeds 290 degree Fahrenheit.

According to yet another embodiment, an article coated with a heat resistant coating enables the article to receive laser printed indicia. The article has indicia printed thereon using the laser printer. The heat resistant coating comprises each of a water based ink, a work and turn coating, Calcium Sulfate, Baking Soda, and fumed Silica. The laser printer includes a fuser assembly the temperature of which, during a printing process, exceeds 290 degree Fahrenheit.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1:
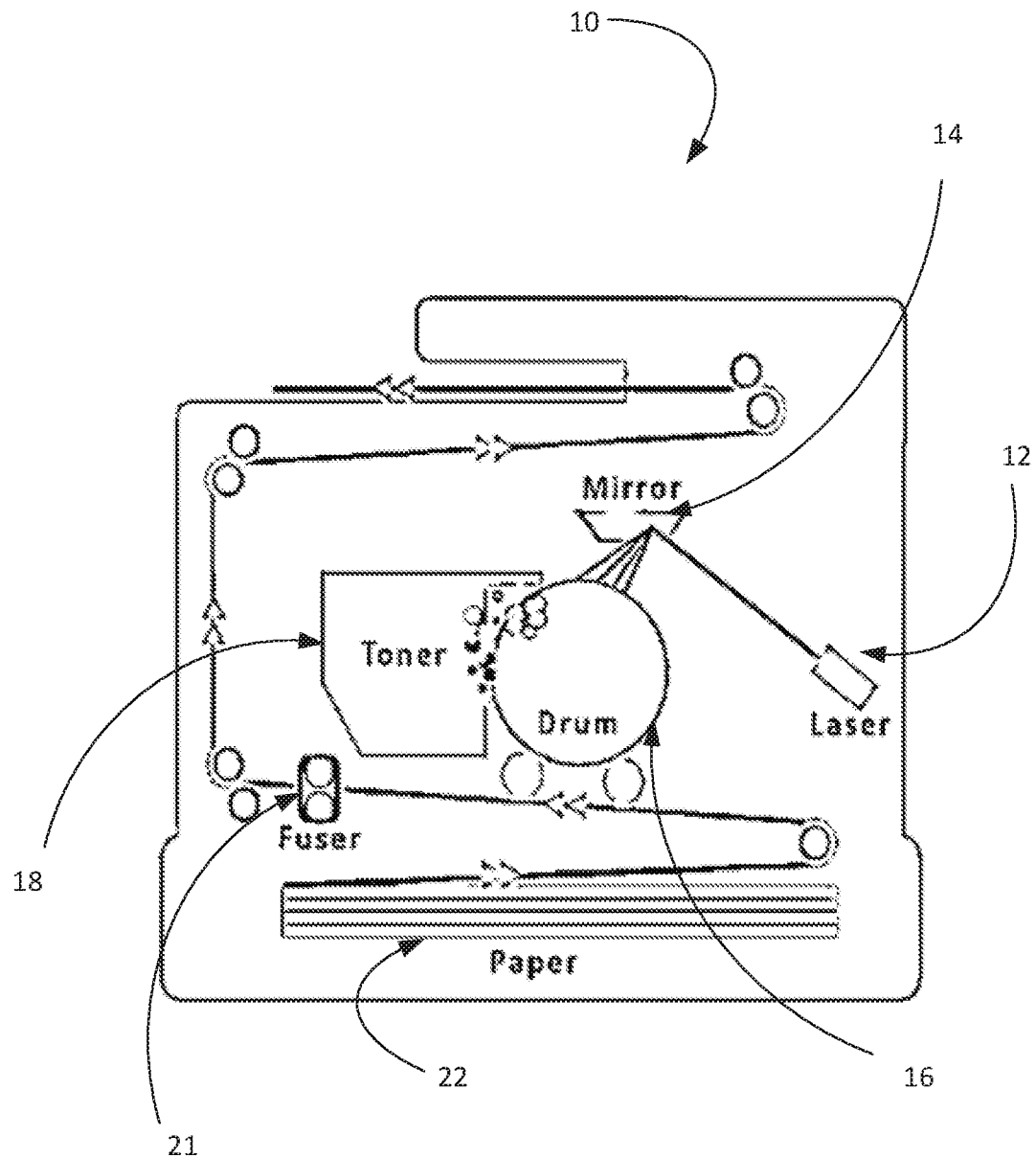
FIG. 1 is a schematic showing a prior art laser printer.

Plastics, also referred to by the artisans as synthetic resins, are well known in the art. Plastics are typically classified into two groups: thermosetting resins and thermoplastic resins. Thermoplastic resins include polyvinyl chloride, polyethylene, polystyrene, polypropylene, etc. Polyethylene, polypropylene, and polyvinyl chloride are respectively the first, second, and third most widely produced synthetic plastic polymers in the world. Polyethylene, polypropylene, and polystyrene are completely dependent on non-renewable resources, such as on oil or gas. Indeed, most plastics are made primarily of petroleum. Polyvinyl chloride does depend on oil and natural gas, but much less so than the other common polymers (only 40 percent of the PVC molecule come from petroleum; 60 percent of PVC molecules comprise chlorine, such as from common salt NaCl). For this reason, polyvinyl chloride (or PVC-$(C_2H_3Cl)_n$)— is often regarded as a natural resource saving plastic. Chlorine also gives PVC useful properties like fire-resistance and durability. These properties, coupled with PVC's wide availability, affordability, and recyclability, make PVC the go-to synthetic resin for a wide array of applications. Global polyvinyl chloride use now exceeds 40 million tons per year, and the demand is growing. At a global level, PVC use grows by an average of 3% per year, with higher growth rates in developing countries.

The artisan understands that the chemical process for making PVC involves taking the simplest unit, called a monomer (the vinyl chloride monomer in this case) and linking the monomers together in a polymerization process. PVC comes in two basic forms: rigid (sometimes abbreviated as RPVC) and flexible. The rigid form of PVC is used in construction for pipes and in profile applications such as doors and windows. Rigid PVC is also used for bottles, other non-food packaging, cards, etc. Rigid PVC can be made softer and more flexible by the addition of plasticizers (e.g., phthalates) or other known materials. Flexible PVC is used in plumbing, electrical cable insulation, imitation leather, signage, phonograph records, inflatable products, etc.

Printable PVC sheets are known in the printing arts and are used in, e.g., aisle marking and other labels in stores and warehouses, bank cards, credit cards, loyalty cards, business cards, promotional materials, etc. In addition to the advantages of PVC mentioned above, printed (or printable) PVC sheets are easy to manipulate (e.g., dye cut cleanly) and the indicia printed thereon has a neat, finished appearance. Such benefits make PVC sheets a highly desirable substrate for a large number of printing applications.

Most commonly, PVC sheets are printed using thermal transfer printers. Unmodified PVC sheets are typically incapable of being printed by inkjet printers and laser printers. Inkjet printers are used to print PVC sheets in certain specialty applications, but only if the PVC sheets are particularly configured for printing by inkjet printers. For reasons discussed herein, conventional laser printers have not heretofore been used for the printing of PVC sheets.

FIG. 1 shows a conventional laser printer 10 in the prior art. As is known, a conventional laser printer 10 includes an activable laser 12, a mirror 14, a specially coated metal cylinder called a drum 16, a carbon toner 18, and a fuser assembly 21 comprising two rollers, at least one of which is configured to be heated. When indicia (e.g., a black or white or colored image or lettering) is to be printed on paper 22, the laser 12 inside the printer 10 beams the indicia on to the drum 16 to give it a static charge. When the drum 16 rolls around, the particles of the carbon toner 18 with opposite static charge attract to the drum 16 and transfer to the paper 22 as the paper 22 passes through. The paper 22 is then heated using the fuser assembly 21 to fuse the toner to the page. The heat from the fuser 21, together with the pressure applied to the substrate (e.g., paper 22) passing through the fuser rollers 21, melts the toner powder and causes it to fuse with the fibers of the substrate. During the printing process, the temperature of the fuser assembly 21 of conventional laser printers 10 typically exceeds 365 degree Fahrenheit, and may be about as high as 392 degree Fahrenheit or higher (e.g., some fuser assemblies of conventional laser printers 20 reach temperatures up to 801 degree Fahrenheit during the printing process). The terms "conventional laser printer" or "laser printer", as used herein, refer to a laser printer (e.g., a monochrome laser printer, a color laser printer, a single sided laser printer, a double sided laser printer, a personal laser printer, an office laser printer, a workgroup laser printer, etc.) whose parts, e.g., the fuser assembly, reach a temperature of over 290 degree Fahrenheit during the printing process. The artisan understands that a vast majority of the laser printers available in the marketplace today will at least in part reach a temperature of over 290 degree Fahrenheit when printing a substrate. The artisan appreciates that there are certain specialty laser printers that use toner that melts at lower temperatures, and which consequently can print on a substrate at lower temperatures; the artisan also understands, however, that such non-traditional laser printers do not see widespread use at least because the toners used therein, due to their relatively low melting points, are not durable.

Unlike laser printers, components of thermal transfer printers (and inkjet printers) do not reach such exorbitant temperatures during the printing process. Typically, the temperature during the thermal transfer printing process ranges from 125 degree Fahrenheit to 170 degree Fahrenheit. The excessive temperatures to which a substrate in a conventional laser printer (such as laser printer 10) is subjected dramatically reduces the types of substrates on which indicia may be printed using such conventional laser printers. For example, indicia cannot be printed using the laser printer 10 on a substrate that melts or otherwise deforms at 150 degree Fahrenheit or less.

In the prior art, a PVC sheet is one example of a substrate on which indicia cannot be printed using a laser printer (such as the laser printer 10). As is known, a PVC sheet begins to deform at about 150 degrees Fahrenheit (or at about 180 degrees Fahrenheit if heat stabilizers are added), begins to decompose at about 280 degrees Fahrenheit, and melts at about 320 degrees Fahrenheit. In the prior art, these temperature-related limitations render PVC sheets incapable of being printed using conventional laser printers.

Laser printers are widely considered to be the most efficient type of printers. For example, laser printers print documents faster than traditional inkjet printers and use less ink as compared to the inkjet printers. They are also easier to clean and maintain. And importantly, the print quality of laser printers is excellent and typically surpasses the print quality of conventional inkjet and other printers. In the prior art, the inability to use laser printers to print PVC sheets, therefore, is a large setback. The artisan may find it desirable to use laser printers (i.e., conventional laser printers as defined above) to print PVC sheets. The present disclosure relates at least in part to addressing this problem. More specifically, the present disclosure, according to an example embodiment, discloses a heat-resistant coating that may be applied to PVC sheets to enable these sheets—which otherwise cannot be printed using laser printers—to be conveniently printed via conventional laser printers.

Figure 2:
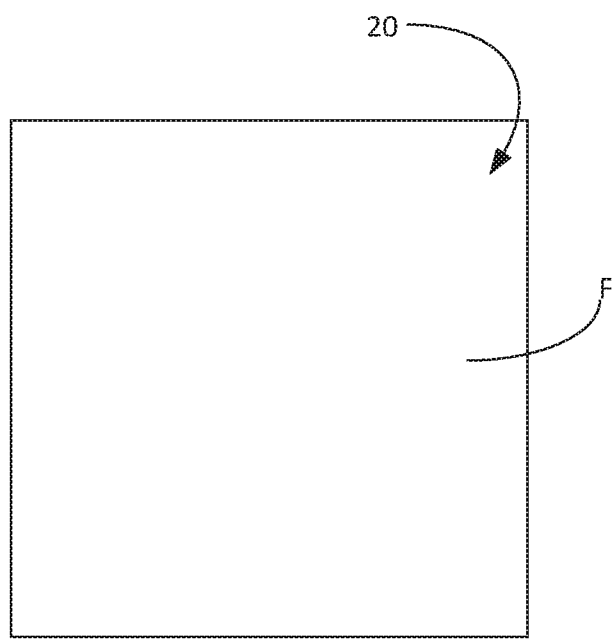
FIG. 2 is a front view of a prior art PVC sheet.
Figure 3:
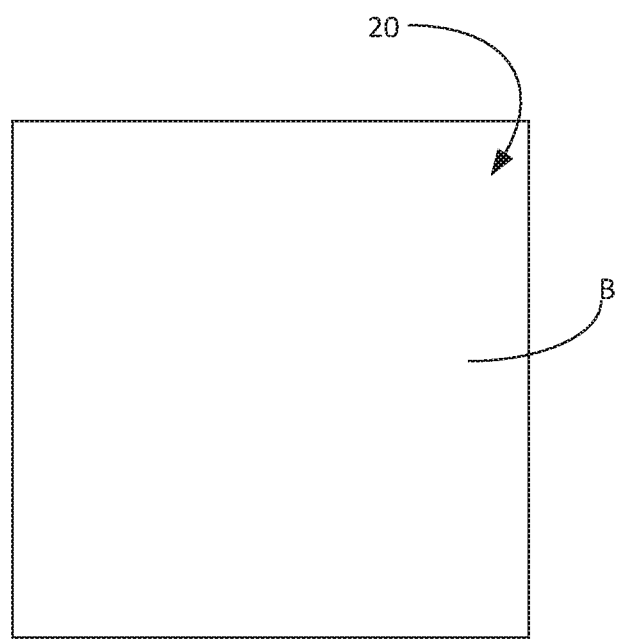
FIG. 3 is a back view of the prior art PVC sheet.

Focus is directed now to FIGS. 2-3, which respectively show a front side F and a back side B of a PRIOR ART PVC sheet 20. The PVC sheet 20 may be of any suitable size (e.g., have any desirable width, height, thickness, etc.). Further, while a symmetrical (i.e., rectangular) PVC sheet 20 is shown, the artisan will understand that the present disclosure is applicable to PVC sheets of any size and shape. In an embodiment, the PVC sheet 20 is of a standard size (e.g., letter, A4, or other such standard size) and has a thickness of about 10 mil (0.01 inches). Of course, these dimensions are merely exemplary and are not intended to be independently limiting.

Figure 4:
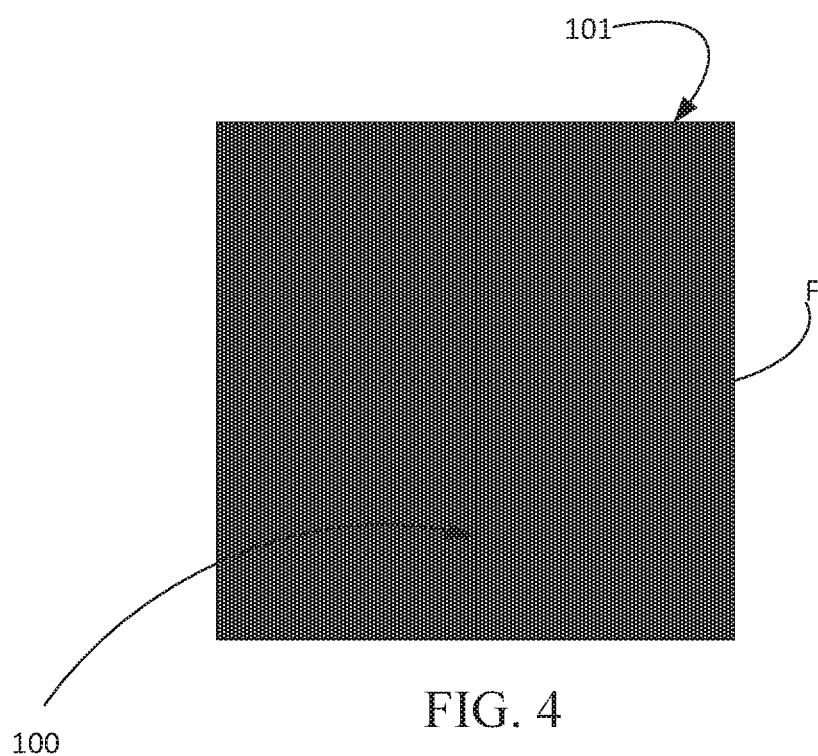
FIG. 4 is a front view of a PVC sheet coated with a heat resistant coating, according to an embodiment of the present disclosure.
Figure 5:
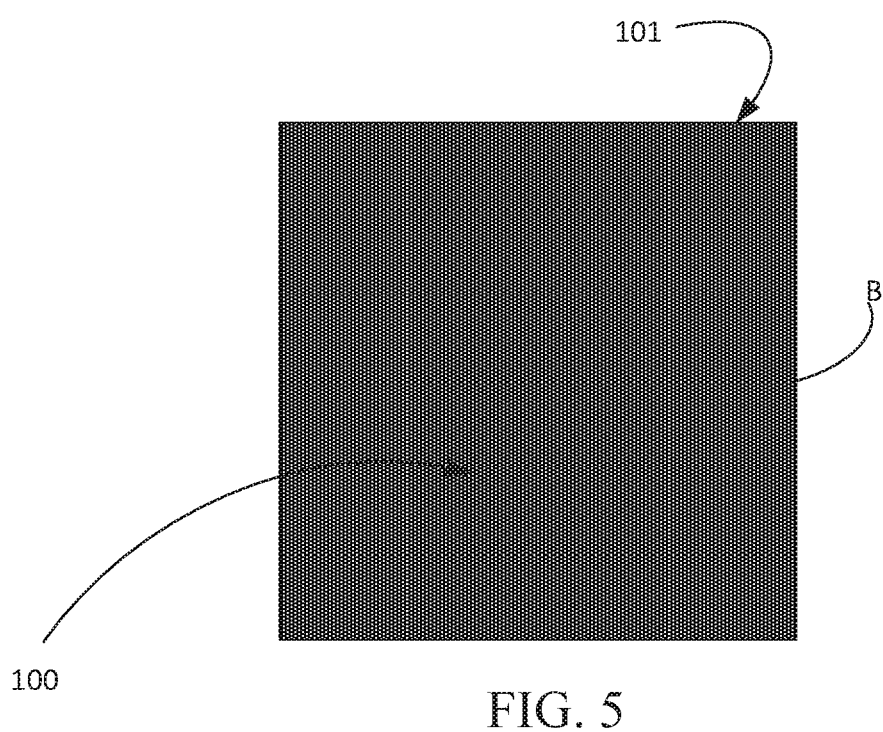
FIG. 5 is a back view of a PVC sheet coated with the heat resistant coating, according to an embodiment of the present disclosure.
Figure 6:
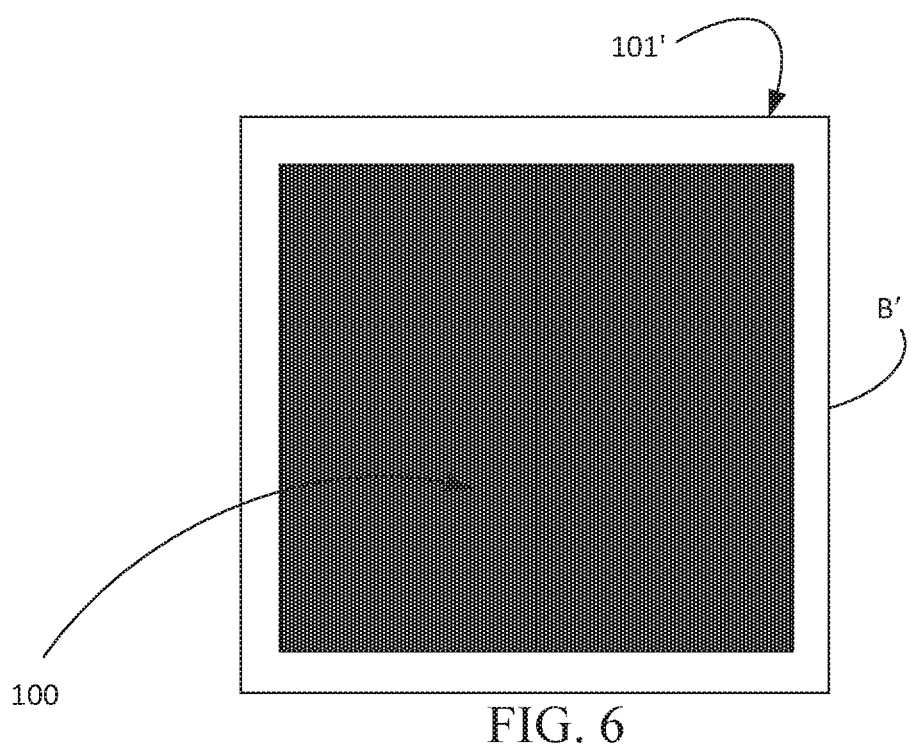
FIG. 6 is a back view of another PVC sheet partially coated with the heat resistant coating.

FIGS. 4 and 5 respectively show a front side F and a back side B of a PVC sheet 101, in accordance with the teachings of the present disclosure. In an embodiment, and as shown, each of the front side F and the back side B may be coated with a heat resistant blend (or coating) 100 described in more detail herein. The coating 100, in embodiments, may sufficiently insulate the underlying PVC sheet from the exorbitant temperatures generally encountered by substrates printed via laser printers, and thereby, allow indicia to be printed on the PVC sheet 101 via laser printers (e.g., the laser printer 10). In some embodiments, each of the front side F and the back side B may be fully coated with the coating 100, as shown in FIGS. 4 and 5. In other embodiments, only a part of the front side F and/or the back side B (e.g., parts of the front side F and/or the back side B configured to receive indicia via laser printers) may receive the coating 100. For example, FIG. 6 shows the back side B' of a PVC sheet 101', only part of which is covered with the coating 100. Of course, in embodiments, the area of the coated surfaces of the back side of a PVC sheet may be different from the area of the coated surfaces on the front side of the PVC sheet.

Table 1 shows the constituents of the heat resistant blend (or coating) 100, according to one illustrative embodiment of the present disclosure, with which the PVC sheet 20 (e.g., the front side F and/or the back side B thereof) may be coated to allow same to be printed via a conventional laser printer.

TABLE 1

| Coating 100 | |
|---|---|
| No. | Ingredient |
| 1 | Water based ink |
| 2 | Work and turn coating |
| 3 | Calcium Sulfate |
| 4 | Baking Soda |
| 5 | Fumed Silica |

Table 2 shows ingredients 102 of a coating 100' that is an example of the coating 100. Table 2 further shows quantity ranges 104 and a preferred quantity 106 of each ingredient 102.

TABLE 2

Coating 100'

| No. | Ingredient 102 | Quantity range 104 | Preferred quantity 106 |
|---|---|---|---|
| 1 | Optafilm ™ Transwhite | 0.5 lbs.-4 lbs. | 2 lbs. |
| 2 | Soft Feel | 0.5 lbs.-2 lbs. | 1 lbs. |
| 3 | Calcium Sulfate | 0.7-2.1 lbs. | 1.4 lbs. |
| 4 | Baking Soda | 0.033 lbs.-0.099 lbs. | 0.066 lbs. |
| 5 | Fumed Silica | 1-3 heaping teaspoons | 2 heaping tsps (about 0.0057 lbs). |

As can be seen, in coating 100', Optafilm™ Transwhite is used as the water based ink and Soft Feel coating is used as the work and turn coating. In embodiments, the work and turn coating may be a water based primer, such as the Prisco® Q9004B low VOC Gloss Primer.

The quantity ranges 104 and the preferred quantities 106 of the various ingredients listed above are merely exemplary and are not intended to be independently limiting. In embodiments, the preferred quantities 106 of the various ingredients listed above may be proportionally reduced or increased for smaller or larger applications, respectively. The preferred quantities 106 listed above will yield a liquid coating 100 of about 4.5 lbs., which may be used to coat many thousands of PVC sheets 20 to enable them to be printed via laser printers. A different amount of coating 100' may be used so long as the weight ratio of the various ingredients 102 remains generally the same as set out in Table 2 (e.g., the weight ratio of the water based ink and the work and turn coating is 2:1, of the water based ink and the Calcium Sulfate is 2:1.4, of the water based ink and the Baking Soda is 2:0.066, and so on).

In embodiments, the order of mixing or otherwise combining the various ingredients 102 in coating 100' (and in coating 100) may be important. Experimentation has shown that if the ingredients 102 listed in Table 2 above are not mixed or otherwise combined in the order in which they are listed in Table 2, that the resulting composition may be unsuitable for the disclosed application (e.g., may not have suitable consistency, may not be readily applicable to the PVC sheet 101, etc.). The coating 100' may be applied to the PVC sheet 20 (e.g., to the front side F and/or the back side B thereof) as discussed herein and allowed to dry thereon. The resulting PVC sheet 101, together with the coating 100 applied thereto, may then be passed through a laser printer (e.g., laser printer 10) for printing. The coating 100' may not detract from the many benefits of PVC sheets discussed above.

The various ingredients 102 of the coating 100' may be sourced as set forth herein. The artisan will understand, however, that the ingredients 102 may also be sourced in other ways. Further, in embodiments, one or more of the ingredients 102 may be omitted and/or another ingredient not listed herein may be added without significantly diminishing the ability of the coating 100 to enable the PVC sheet 101 to be printed using laser printers.

In an embodiment, the Optafilm™ Transwhite may be sourced from ACTEGA. Optafilm™ Transwhite may be clear and serve as the base of the coating 100. The Soft Feel, in an embodiment, may be sourced from Prisco. The Calcium Sulfate, as is known, is commonly available, and may be in powdered form. Baking soda and Fumed Silica are also readily available and may be sourced from any one of numerous sources.

The process for forming the coating using the ingredients 102 will now be described. The artisan will understand that this process is exemplary only and is not intended to be independently limiting. In an embodiment, the process for forming the coating 100' may begin with a user taking a clean container, measuring 2 lbs. of the Optafilm™ Transwhite, and placing same in the clean container. The user may then measure out 1 lb. of Soft Feel and place it in the container. The user may then sequentially place in the container the 1.4 lbs. of Calcium Sulfate, the 0.066 lbs. of Baking Soda, and the 2 heaping teaspoons of Fumed Silica. Of course, in embodiments, the user may first measure out the stated quantities of each ingredient 102 and then place the ingredients in the container in order, as disclosed herein.

Once the ingredients 102 are situated within the container, they may be blended together to form the coating 100'. In an embodiment, the ingredients 102 may be mixed in two cycles using a drill having a cutting blade, e.g., at about 1,700 rpm, for thirty to forty seconds per cycle. The resulting mixture may then be allowed to set (e.g., overnight). The coating 100' may now be ready for use.

The coating 100' may be applied relatively uniformly to the PVC sheet 20, e.g., to at least one of the front side F and the back side B thereof. The application may be effectuated by rollers (e.g., by a reverse roll transfer process) or other means (e.g., via a paint brush or a squeegee). The coating 100', after it is applied to the PVC sheet 20 to form PVC sheet 101, may be dried (e.g., air dried using fans). Once the coating 100' dries and hardens, the PVC sheet 101 may be ready to be passed through the laser printer for printing. Specifically, the PVC sheet 101 may be fed through a conventional laser printer and the heat-resistant coating 100' may insulate the PVC sheet 101 from the heat emanated by the fuser assembly. The PVC sheet 101 may thus be printed using the laser printer without melting, deforming, or otherwise damaging the sheet 101. The coating 100' may desirably receive the printed indicia from the laser printer for consumer consumption.

It is envisioned that the laser printable PVC sheets may be arranged as a stack and fed to the laser printer individually, or that alternately, a roll of PVC sheets coated with the coating 100 may be fed into the laser printer for printing. The printing may be monochrome or color, and may be effectuated by any conventional laser printer (as defined above).

Figure 7:
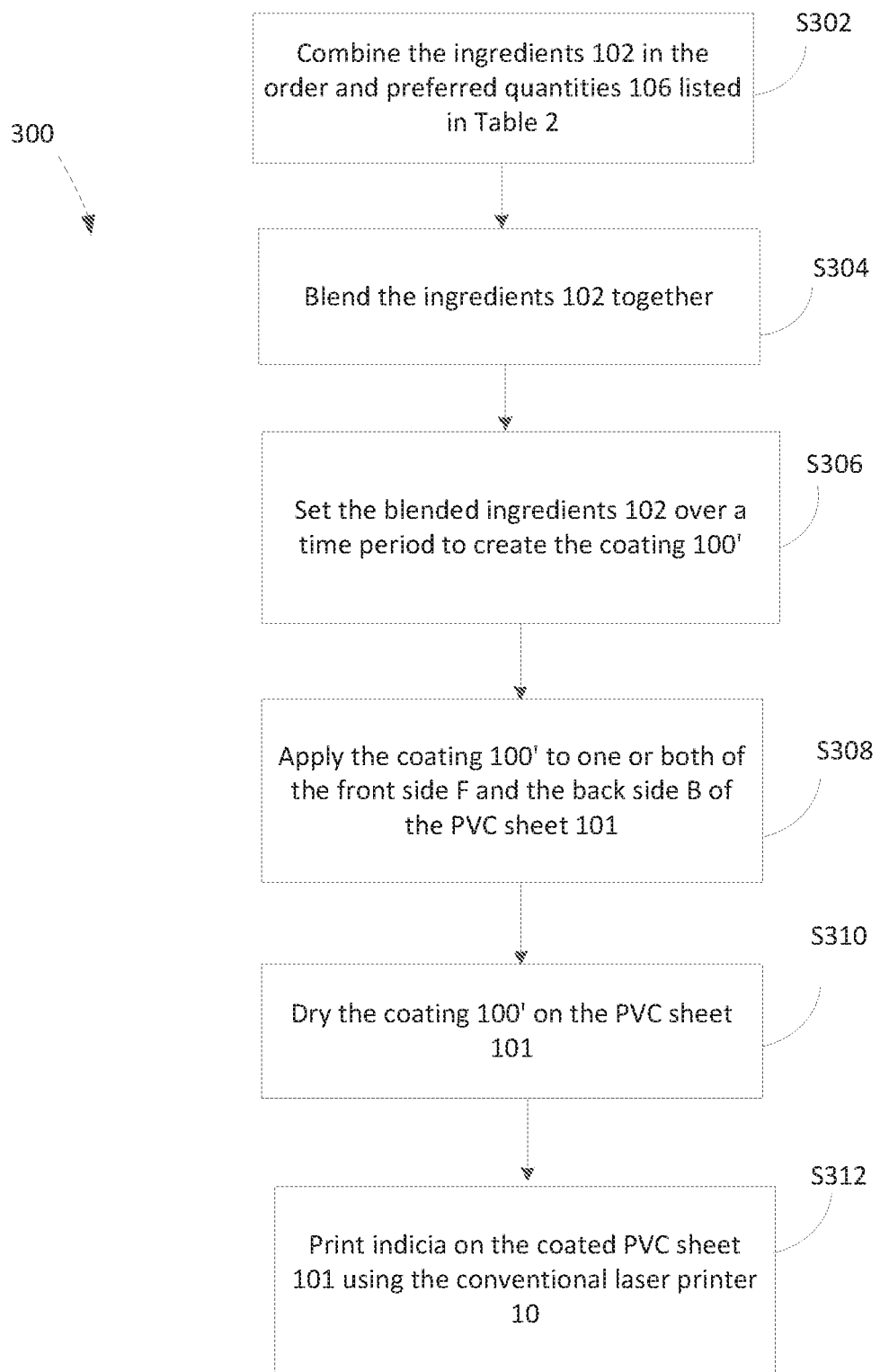
FIG. 7 is a flowchart illustrating a method of making and using the PVC sheet of FIGS. 4 and 5.

FIG. 7 illustrates a method 300 for making and using the PVC sheet 101 comprising the coating 100', in an embodiment. While FIG. 7 illustrates the method 300 with respect to the coating 100', the artisan will readily appreciate that the method 300 may be used to make the coating 100 and other suitable coatings.

At step S302, a user may combine the ingredients 102 of the coating 100' in the order listed in Table 2, as described above. The user may combine the ingredients 102 in the preferred quantities 106. At step S304, the user may blend the ingredients 102 together, e.g., in two cycles using a drill having a cutting blade or via other means. At step S306, the user may allow the blended ingredients to set, e.g., for 12-24 hours, to form the coating 100'. At step S308, the user may coat the PVC sheet 101, e.g., one or both sides thereof, with the coating 100'. At step S310, the user may allow the coating 100' on the PVC sheet 101 to dry so that the PVC sheet 101 (i.e., the coating 100' thereof) may accept laser printed indicia. At step S312, the user may print indicia (e.g., color or monochrome text and/or image) on the PVC sheet 101 with a conventional laser printer, e.g., laser printer 10.

The resulting laser-printed PVC product may have endless applications. For example, the laser-printed PVC sheet may be used as a label (e.g., a grocery store aisle label, an advertising label, or other label). In embodiments, when the laser-printable PVC sheet is being used in applications requiring one-sided printing, the sheet 101 may be coated with the coating 100' only one side (e.g., when the coated PVC sheet is being used as a single sided label, only the front side F thereof may be coated with the coating 100' as the adhesive on the back side, together with the liner, may insulate the back side B from the high temperatures encountered within the laser printer). In other embodiments, both sides B and F of the PVC sheet 101 may be coated with the coating 100, which may allow for double-sided printing on the coated PVC sheet. In some embodiments, the sheet 101 may be coated with the coating 100' on both sides B and F but printed only on one side.

A solitary PVC sheet 101 may, in embodiments, be used to make two or more products (e.g., two or more labels, bank cards, credit cards, membership cards, promotional materials, etc.). As noted, the coating 100' may not detract from the ability of the PVC sheet 101 to be conveniently and cleanly dye cut.

While the coating 100 and 100' described herein may be used to enable PVC sheets 101 to be printed using laser printers, the use of the coating 100 is not so limited. Indeed, other types of synthetics that deform at the relatively high temperatures encountered in conventional laser printers may likewise be coated with the heat-resistant coatings 100 and 100' to enable them to be printed using conventional laser printers. For example, the coating 100 and 100' may be applied to polypropylene, polyethylene (e.g., HPDE), and other synthetic plastic sheets to allow these sheets to be printed using conventional laser printers.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A method of printing indicia with a laser printer on a PVC sheet, comprising:
    manufacturing a heat resistant coating, said heat resistant coating comprising each of a water based ink, a work and turn coating, and calcium sulfate;
    applying said heat resistant coating to said PVC sheet;
    allowing said heat resistant coating to dry on said PVC sheet; and
    printing with said laser printer indicia on said PVC sheet;
    wherein, during the printing process, a temperature of a fuser assembly of said laser printer exceeds 290 degrees Fahrenheit.

2. The method of claim 1, further comprising applying said heat resistant coating to said PVC sheet with a roller.

3. The method of sheet of claim 1, wherein manufacturing said heat resistant coating includes blending each of said water based ink, said work and turn coating, and said Calcium Sulfate.

4. The method of claim 1, wherein manufacturing said heat resistant coating includes sequentially combining each of said water based ink, said work and turn coating, and said Calcium Sulfate.

5. The method of sheet of claim 1, wherein a ratio of said water based ink and said work and turn coating is about 2:1 by weight.

6. The method of claim 1, wherein said heat resistant coating is applied only to a portion of said PVC sheet.

7. A method of printing on a PVC sheet indicia with a laser printer, comprising:
    manufacturing a heat resistant coating, said heat resistant coating comprising each of a water based ink, a work and turn coating, calcium sulfate, baking soda, and fumed silica;
    applying said heat resistant coating to said PVC sheet;
    allowing said heat resistant coating to dry on said PVC sheet; and
    printing indicia on said PVC sheet with said laser printer;
    wherein, during the printing process, a temperature of a fuser assembly of said laser printer exceeds 290 degrees Fahrenheit.

8. The method of sheet of claim 7, wherein manufacturing said heat resistant coating includes blending each of said water based ink, said work and turn coating, said Calcium Sulfate, said Baking Soda, and said fumed Silica for a time period.

9. The method of claim 7, wherein manufacturing said heat resistant coating includes sequentially combining each of said water based ink, said work and turn coating, said Calcium Sulfate, said Baking Soda, and said fumed Silica.

10. The method of sheet of claim 7, wherein a ratio of said water based ink and said work and turn coating is about 2:1 by weight.

11. The method of sheet of claim 7, wherein a ratio of said water based ink and said Calcium Sulfate is about 2:1.4 by weight.

12. The method of sheet of claim 7, wherein a ratio of said water based ink and said Baking Soda is about 2:0.066 by weight.

13. The method of claim 7, wherein said heat resistant coating is applied only to a portion of said PVC sheet.

14. The method of claim 7, wherein said indicia is monochrome indicia.

15. The method of claim 7, wherein said indicia is color indicia.

* * * * *